United States Patent
Shreiner

(10) Patent No.: US 6,386,518 B1
(45) Date of Patent: May 14, 2002

(54) HANDRAIL AND END MEMBER ASSEMBLY

(75) Inventor: Thomas A. Shreiner, Picture Rocks, PA (US)

(73) Assignee: Construction Specialties, Inc., Lebanon, NJ (US)

( * ) Notice: Subject to any disclaimer, the term of this patent is extended or adjusted under 35 U.S.C. 154(b) by 0 days.

(21) Appl. No.: 09/767,006

(22) Filed: Jan. 22, 2001

(51) Int. Cl.$^7$ ............................................... E04H 17/14
(52) U.S. Cl. ..................... 256/65; 403/374.1; 403/374.2
(58) Field of Search ............................ 52/27; 248/315, 248/205, 320, 321; 256/65; 403/374.1, 374.2; 285/179; 411/372, 378

(56) References Cited

U.S. PATENT DOCUMENTS

| | | | |
|---|---|---|---|
| 304,435 A | * | 9/1884 | Malick |
| 3,306,585 A | * | 2/1967 | Blum |
| 3,544,072 A | * | 12/1970 | Thom |
| 5,143,339 A | * | 9/1992 | Ashcraft |
| 5,193,786 A | * | 3/1993 | Guenther |
| 5,273,258 A | * | 12/1993 | Bedics |
| 5,292,013 A | * | 3/1994 | Earl |
| 5,396,740 A | * | 3/1995 | Bocchi |
| 5,765,812 A | * | 6/1998 | Guenther |
| 5,908,185 A | * | 6/1999 | Collette |
| 6,036,156 A | * | 3/2000 | Collette |

OTHER PUBLICATIONS

"C/S Acrovyn®" catalog, C/S Group, 2001, pp. 17–20, 29.

* cited by examiner

Primary Examiner—Carl D. Friedman
Assistant Examiner—Kevin McDermott
(74) Attorney, Agent, or Firm—Baker Botts L.L.P.

(57) ABSTRACT

An end member is joined against axial displacement to a handrail by a lock member that is coupled to a mounting flange portion of the end member against axial movement and for rotation relative to the mounting flange portion. A locking cam portion of the lock member is received in an under cut mounting groove of the handrail and is configured to permit the lock member to be moved axially along the locking groove in an unlocked rotational position relative to the locking groove and to frictionally engage walls of the locking groove in a locked rotational position relative to the locking groove and thereby retain the end member against axial movement relative to the handrail.

17 Claims, 6 Drawing Sheets

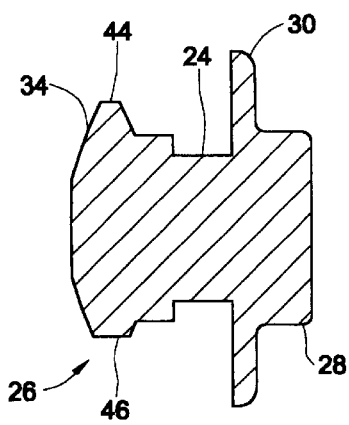
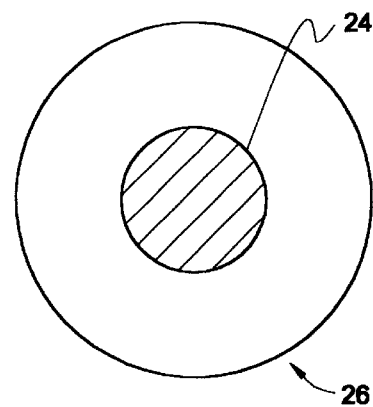
FIG. 10
FIG. 11
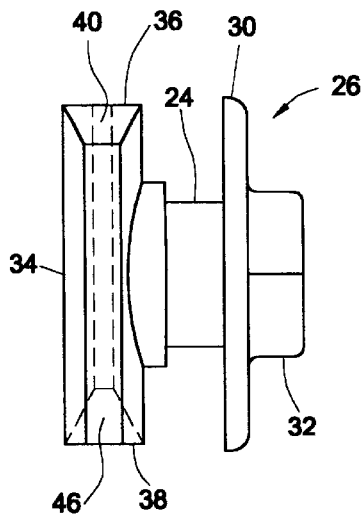
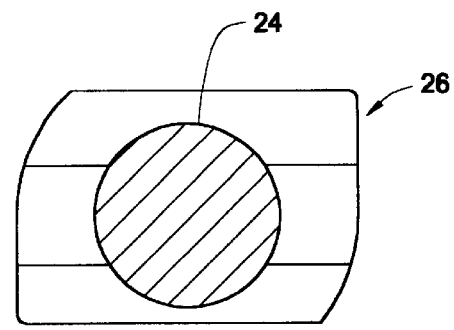
FIG. 12
FIG. 13

HANDRAIL AND END MEMBER ASSEMBLY

BACKGROUND OF THE INVENTION

The present invention relates to handrails of the type that are mounted on walls and that have end members that are installed on the exposed ends of the handrails to prevent clothing, the hands and arms of persons, and objects from being caught in an otherwise open gap between the wall and the end of the handrail.

Construction Specialties, Inc., the assignee of the present invention, makes and sells a line of wall protection products under the trademark ACROVYN®. The ACROVYN® line includes several styles of handrails that have extruded aluminum retainers and covers of polyvinyl chloride (PVC) blended with a small amount of an acrylic polymer that are mounted on the retainers. The retainers provide the strength and rigidity for the support of persons who use the handrails for assistance and also endure impacts of objects that strike the handrails. The covers provide durable and attractive surfaces to the exposed parts of the handrail. Handrails similar to the ACROVYN® handrails are available from several suppliers.

Wall-mounted handrails of all types are supported in spaced relation to the walls so as to leave a space between the handgrip portion of the handrail and the wall for the user's fingers. It is a well-known and virtually universal practice to have an end member (often called an "end cap") that is part of the handrail or is installed on the handrail to cover an exposed end, such as at door openings, and close the gap that would otherwise exist between the end of the handrail and the wall and would be susceptible to allowing clothing or a hand of a person or a part of an object to become caught by the end of the handrail. End caps usually are curved or angled to deflect objects away from the wall and have free ends remote from the handrail body located very close to the wall. Where sections of a handrail run along walls that meet at outside corners, curved corner handrail members similar to end caps, and often end caps configured to be attached to the handrail sections and thus suited for dual use, are joined to the handrail sections.

In a handrail of the ACROVYN® type, an end cap previously has been coupled to the handrail by reception of one or more locating bosses that project from the body of the end cap and extend into corresponding socket(s) in the aluminum retainer and by a flange on the end cap that is secured to the retainer by screws or bolts and nuts. The mounting of the end caps on the retainer of handrails in the previously known arrangements is tedious and time-consuming.

Ordinarily, the end caps are installed on the retainer before the retainer is mounted on the wall. After the retainer is installed, the fasteners for the end caps are no longer accessible. Should adjustment of the position of the end cap be required, such as to form a tight joint with the handrail cover, it is necessary to remove the cover to gain access to the fasteners.

SUMMARY OF THE INVENTION

An object of the present invention is to provide a handrail and end member assembly that is easily and quickly assembled and has a single inexpensive fastener component. Another object is to provide a handrail and end member assembly that allows adjustment of an end member relative to a handrail without having to disassemble any part of the assembly.

The foregoing objects are attained, in accordance with the present invention, by a handrail and end member assembly that includes an elongated handrail having an axis, an undercut groove of a generally "C" shape in cross section extending axially along at least an end part of the handrail, and an end member received adjacent the end part of the handrail and having a mounting flange portion located in overlapping relation to the undercut groove. A lock member is coupled to the mounting flange portion against movement of the lock member relative to the mounting flange portion in a direction parallel to the handrail axis and for rotation relative to the mounting flange portion about a lock member axis perpendicular to the handrail axis. A locking cam portion of the lock member that is received in the mounting groove is configured to permit the lock member to be moved axially along the locking groove in an unlocked rotational position relative to the locking groove and to frictionally engage walls of the locking groove in a locked rotational position relative to the locking groove and thereby retain the end member against axial movement relative to the handrail.

The lock member, by virtue of its configuration, as described above, is quickly and easily moved between the locked position and unlocked position; locking and unlocking the lock member requires rotating it only one-quarter of a revolution about its axis. Securing the end member to the handrail, moreover, involves only a single fastener member, as compared to two or more screws or bolts/nuts, as in previously known handrail/end member structures. By its nature, the lock member is relatively large and thus more easily handled and manipulated, as compared to screws and nuts/bolts.

In a preferred arrangement, in which coupling the lock member to the mounting flange portion is facilitated, a shank portion of the lock member is received in a substantially vertically oriented slot in the mounting flange portion of the end member. To secure the end member to the handrail against displacements in directions other than axially of the handrail, the handrail includes at least one socket portion in at least the end part thereof, and the end member has a positioning boss portion telescopically received in the socket portion of the handrail.

The lock member should have a head that is formed with a tool-receiving formation, such as facets like those of a nut, adapted to receive a tool for use to facilitate rotating the lock member.

In advantageous configurations, the locking cam portion of the cam member includes upper and lower locking portions lying substantially parallel to the handrail axis in the locked position that frictionally engage opposed upper and lower portions of the undercut groove in the locked position and upper and lower tapered and curved lead-in portions adjacent the locking portions that permit the locking portions to move gradually into pressure engagement with the upper and lower portions of the undercut groove upon rotation of the lock member from the unlocked position to the locked position. In addition, the locking cam portion has right and left end portions intermediate the upper and lower locking and lead-in portions. (For convenience in describing the invention and the embodiment, the portions of the undercut groove in the retainer and the parts of the lock member are termed "upper" and "lower" with respect to the locked position of the lock member and "right" and "left" with respect to the front of the handrail.) By making the end portions substantially narrower than the upper and lower portions, insertion of the locking cam portion into the receiving groove in the handrail and sliding it endwise into position are facilitated. With such a configuration, each of the lead-in portions widens progressively in a direction from the adjacent end portion toward the adjacent locking portion.

The lock member is well-suited by its design and function to be made in one piece as a moldment of a solid polymeric material, for example, nylon. Other materials, including metals, can be used for the lock member.

It is advantageous to use the invention in handrails of the type having a retainer of extruded aluminum and a cover of a polymeric material received on a portion of the retainer located to face away from the wall. The undercut groove may be located on a portion of the retainer that faces toward the wall and is not covered by the cover, thus making the lock member inconspicuous but also making it accessible for operation to make adjustments in the position of the end member, should that be necessary.

For a better understanding of the invention, reference may be made to the following description of an exemplary embodiment of the present invention, taken in conjunction with the accompanying drawings.

DESCRIPTION OF THE DRAWINGS

FIGS. 6 to 13 are views of the lock member, as follows:

FIG. 6—rear elevational;

FIG. 7—front elevational;

FIG. 8—top plan and a mirror image of the bottom plan;

FIG. 9—left side elevational;

FIG. 10—top cross sectional along the lines 10—10 of FIG. 6;

FIG. 11—front cross sectional along the lines 11—11 of FIG. 8;

FIG. 12—left side elevational; and

FIG. 13—rear cross sectional along lines 13—13 of FIG. 9;

DESCRIPTION OF THE EMBODIMENT

The embodiment is a handrail and end member assembly in which the handrail 10 is composed of an elongated, extruded aluminum retainer 12 and a cover 14 of a durable rigid polymeric material, such as PVC blended with a small amount of an acrylic polymer. The retainer and cover are of any desired length, depending on the installation conditions, and are usually mounted on a wall (though they are suitable for mounting on posts) by means of brackets (not shown) that are secured to the wall at a suitable spacing axially of the handrail. An end cap 16, which is injection-molded from a durable polymeric material such as ABS, is received at each exposed end of a handrail section. The end cap 16 is one form of end member that may be affixed to the end of a handrail. As described below and shown in FIGS. 14 to 16, another form of end member is a corner bracket that is used with an end cap 16 to join two sections of a handrail at an outside corner formed by mutually perpendicular building walls. Handrails of the foregoing general construction are well-known in several cross-sectional shapes, some of which include bumper portions below the handgrip portions.

Figure 2:
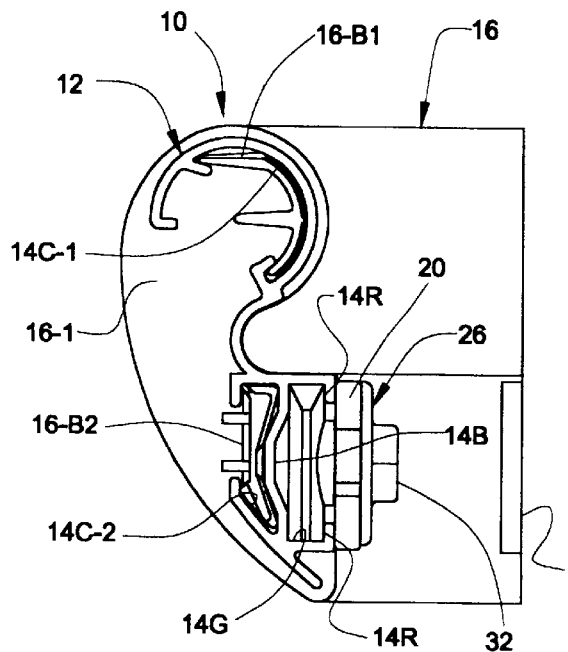
FIG. 2 is an end elevational view of the embodiment of FIG. 1, also showing the end member and lock member in the secured position.
Figure 3:
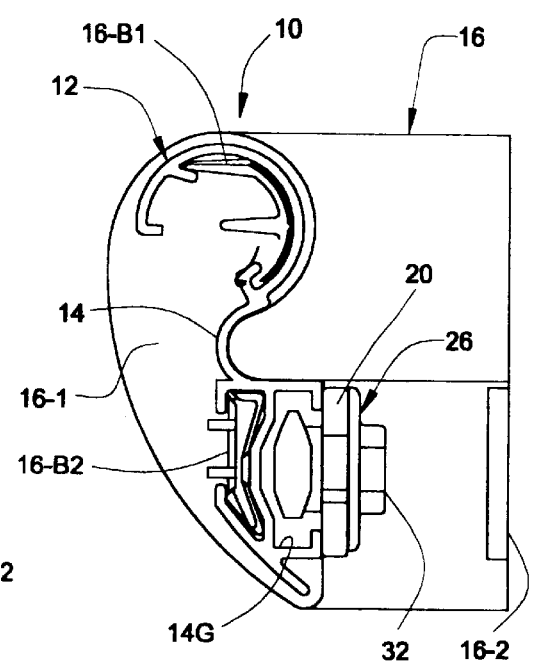
FIG. 3 is an end elevational view of the embodiment of FIGS. 1 and 2, showing the end member and lock member in the released position.
Figure 14:
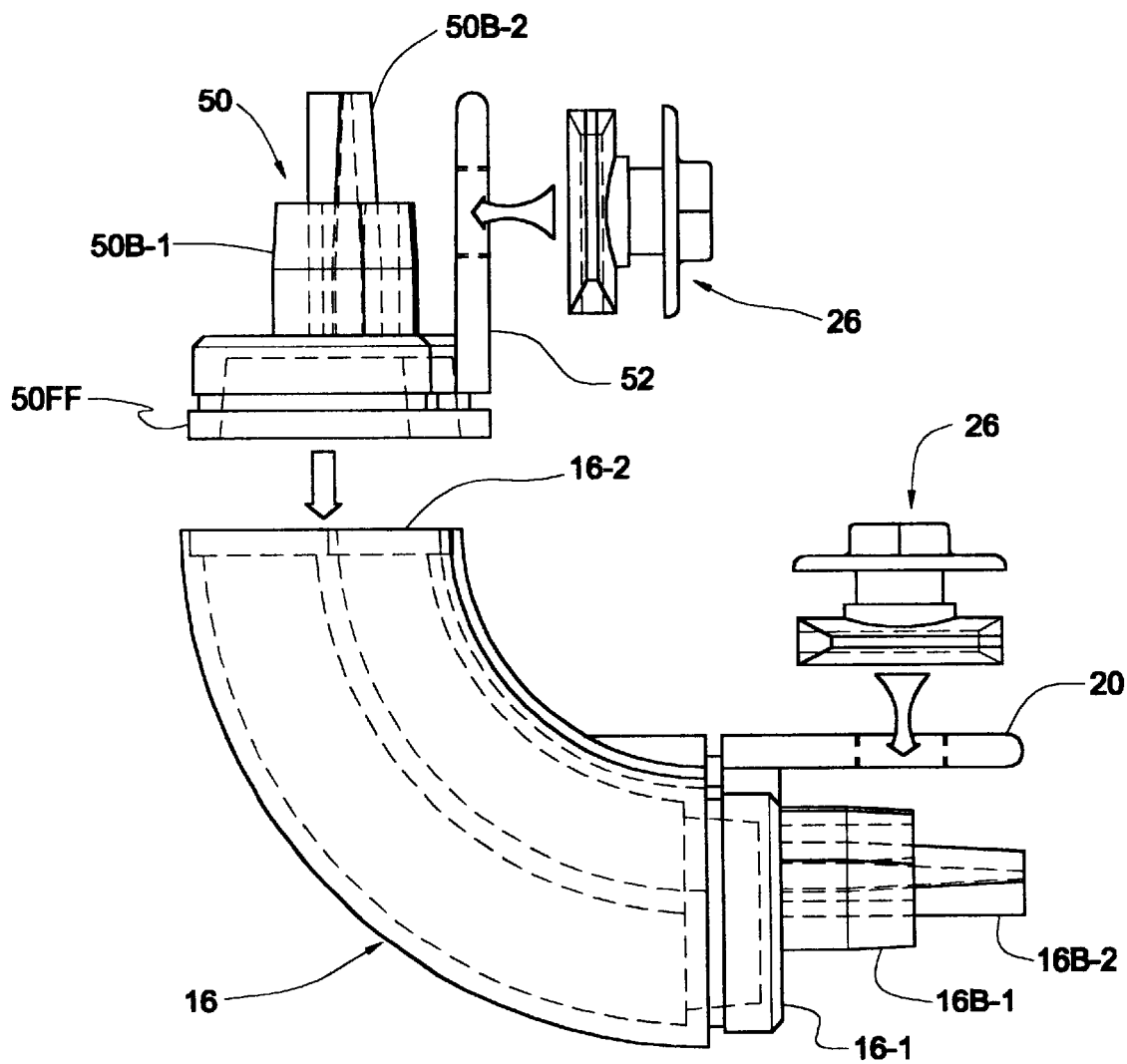
FIG. 14 is an exploded top pictorial view of the end member of FIGS. 1 to 5 and an end corner bracket used with the end member to provide an outside corner section of a handrail.
Figure 15:
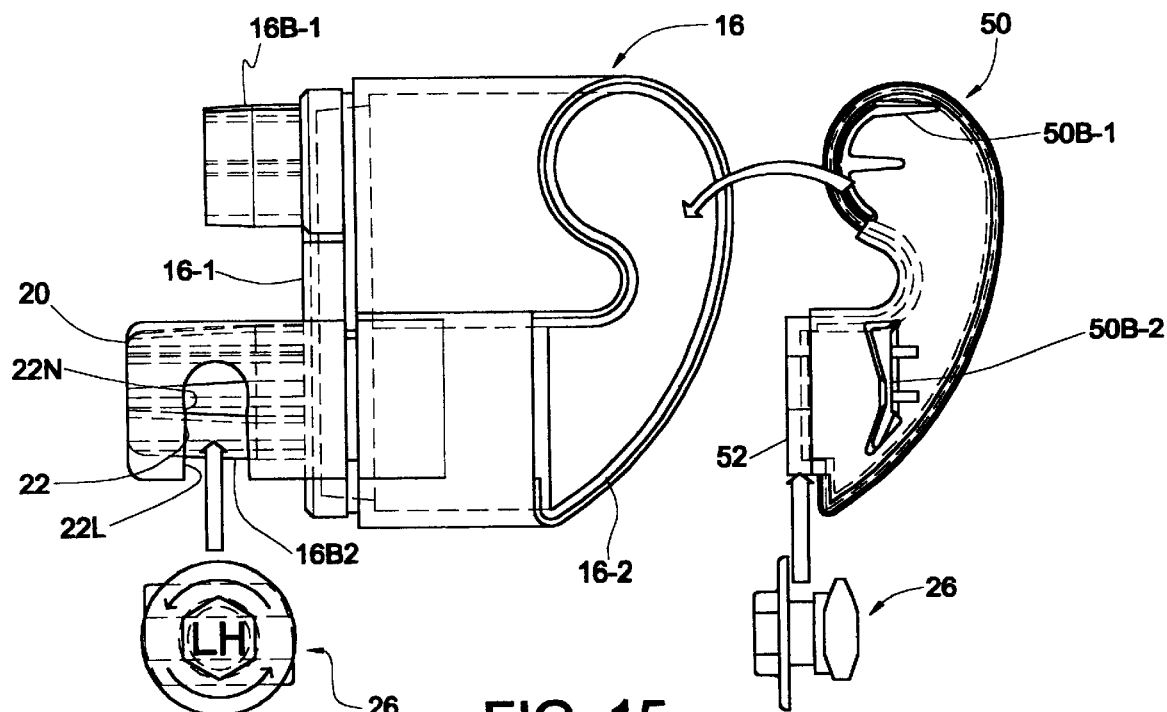
FIG. 15 is an exploded view of the components of FIG. 14, viewed from the rear of the end member.
Figure 16:
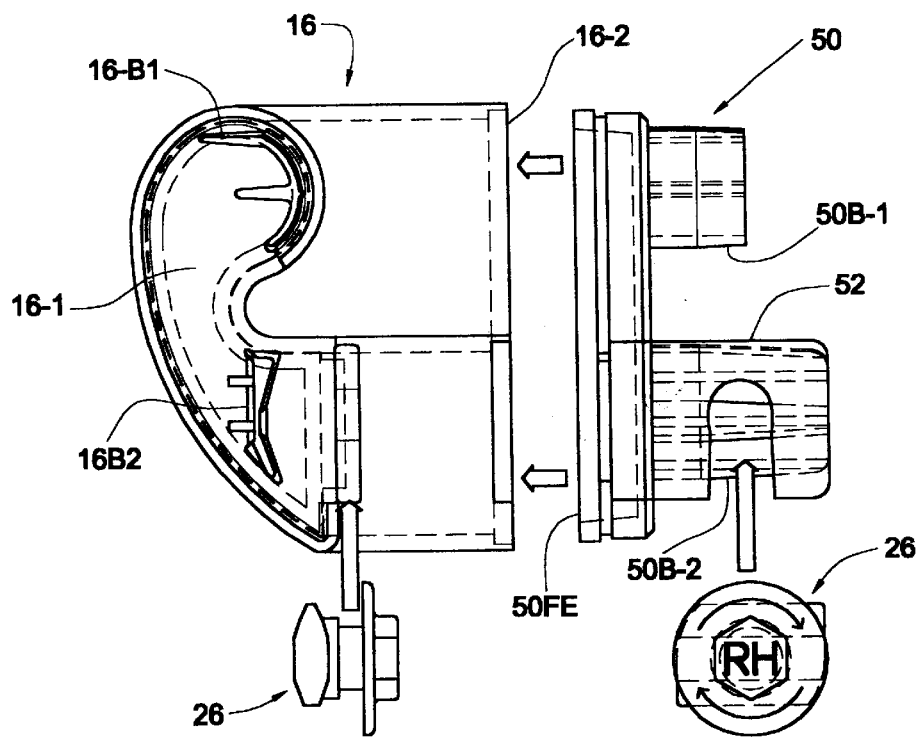
FIG. 16 is another exploded view of the components shown in FIGS. 14 and 15, viewing from the end of the end member that adjoins the handrail.

As best shown in FIGS. 14 to 16, the end cap 16 has an outer profile in cross section matching that of the handrail cover 14 and in top plan (FIG. 14) is curved from an end 16-1 that when installed abuts the end of a handrail to an end 16-2 that lies close to the wall on which the handrail is installed. As mentioned above and described below, FIGS. 14 to 16 also illustrate an alternative use of the end cap 16 as a corner piece for handrail sections mounted along walls that meet at an outside corner. The end 16-1 has an upper boss portion 16-B1 and a lower boss portion 16-B2 in the form of shells and ribs that form overall outer shapes that enable them to be telescopically received in cavities 14-C1 and 14-C2 defined by portions (e.g., walls and ribs or grooves) of the handrail cross section (see FIGS. 2 and 3) and when so received to be durably secured in end-to-end register with the end of the handrail against displacements in any direction perpendicular to the handrail axis, including displacements that might result from impacts from persons and objects that strike the end cap.

The end cap 16 also includes a projecting mounting flange 20 that overlies the back surfaces of a pair of L-shaped ribs 14R on the retainer 14 that, together with a base 14B, form an undercut groove 14G on the retainer. A vertical slot 22 in the mounting flange 20 receives a stepped shank portion 24 of a lock member 26. As may be seen in FIGS. 15 and 16, the lower part 22L of the slot 22 widens downwardly to facilitate receiving the shank portion 24, and a slightly constricted neck 22N in an interference fit with the shank retains the shank portion 24 of the lock member 26 in the upper end portion of the mounting flange 20 during assembly of the end cap 16 to the handrail.

Figure 1:
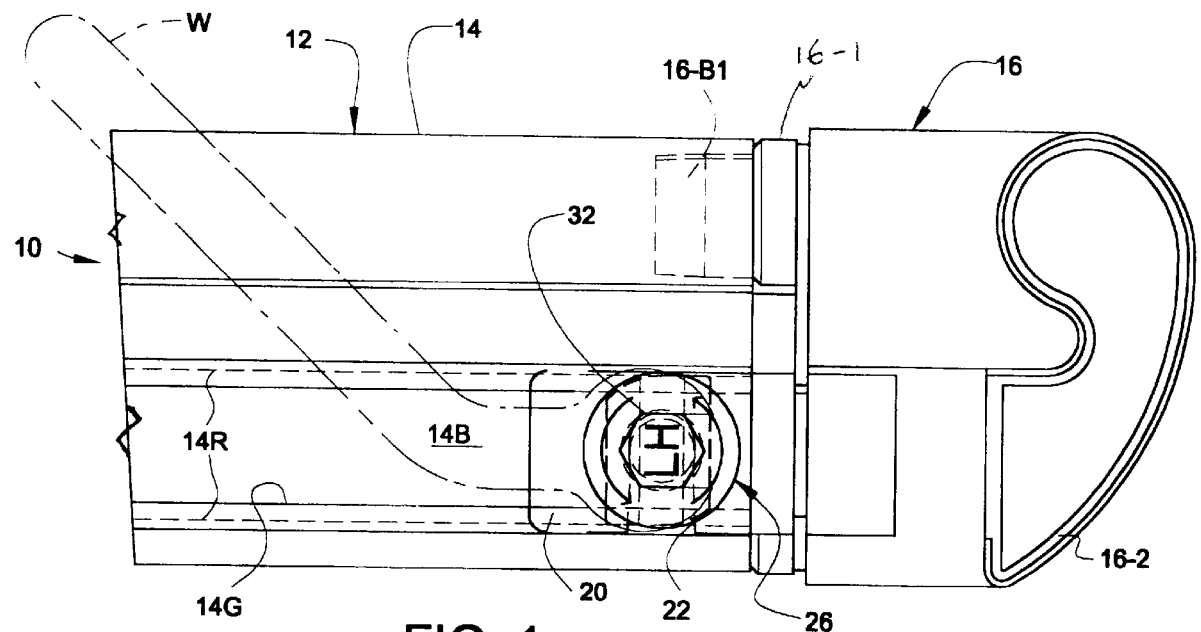
FIG. 1 is a rear elevational view of an embodiment, showing the end member and lock member in a secured position on a short section of a handrail.
Figure 4:
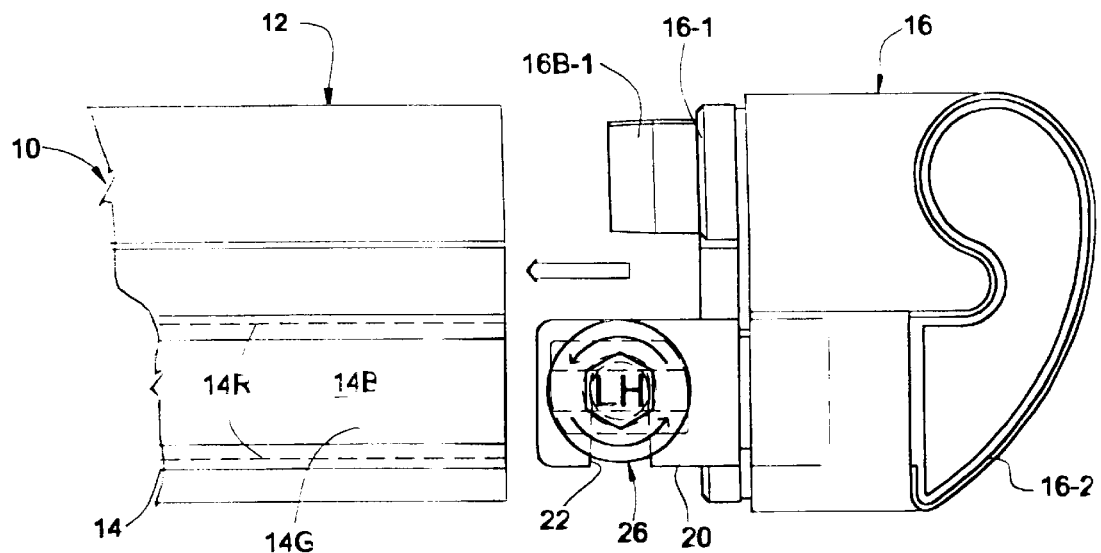
FIG. 4 is a rear elevational view showing the embodiment of FIGS. 1 to 3 with the end member and lock member in positions to be assembled to the handrail.
Figure 5:
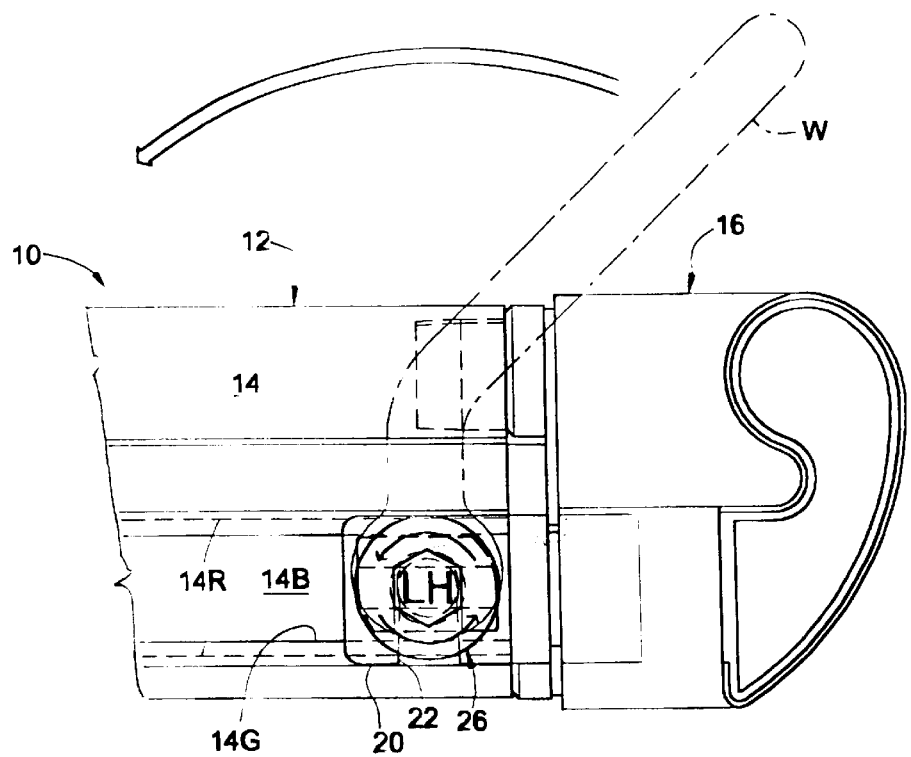
FIG. 5 is a rear elevational view showing the embodiment of FIGS. 1 to 4 with the end member assembled to the handrail but not yet secured in the locked position.

Referring to FIGS. 6 to 13, the lock member 26 has a head portion 28, which includes a washer part 30 and a hex head part 32 for receiving an open end wrench W (FIGS. 1 and 4). The head portion 28 is received to the rear of the mounting flange 20 of the end cap (see, e.g., FIGS. 1 to 3) with the washer part 30 and the shoulder of the stepped shank 24 bearing against the rear and front faces of the mounting flange. When the end cap 16 is assembled to the retainer 12, a locking cam portion 34 of the lock member 26 is received in the groove 14G of the retainer.

The peripheral portion of the locking cam portion 34 has upper and lower locking portions 36 and 38 lying substantially parallel to the handrail axis in the locked position of the lock member (FIGS. 1 and 2) that frictionally engage opposed upper and lower portions of the undercut groove 14G defined by the L-shaped ribs 14R (in the locked position); upper and lower curved lead-in portions 40 and 42 adjacent the locking portions that permit the locking portions to move gradually into pressure engagement with the upper and lower portions of the undercut groove 14G of the retainer upon rotation of the lock member from the unlocked position to the locked position; and left and right end portions 44 and 46 intermediate the upper and lower locking and lead-in portions. The end portions are narrower than the locking portions to facilitate sliding the lock member along the groove in the retainer.

In the embodiment, the lock member 26 is unitary and a moldment of a solid polymeric material, such as nylon. Other materials can be used for the lock member. In the locked position, the upper and lower locking portions 36 and 38 of the locking cam portion are placed in compression by engagement with the upper and lower portions of the undercut groove 14G in the retainer 14 defined by the L-shaped ribs 14F, thus generating frictional forces at the interfaces which lock the end cap to the retainer in the axial direction.

The hex head 32 is readily accessible to a wrench W (see FIGS. 1 to 3) but is ordinarily not visible from normal viewpoints, being hidden from view by the rail body from in front and by the end cap from the end. The accessibility of the lock member to a wrench when the handrail and end cap are installed on a wall permits adjustment of the end cap on the handrail axially, such as when a cover does not fit properly at room temperature, which sometimes occurs when handrails are assembled and installed in cold or hot weather and expand or contract when the building is brought to room temperature. Other forms of tool-engageable formations can be used in place of the hex head 32.

Figure 6:
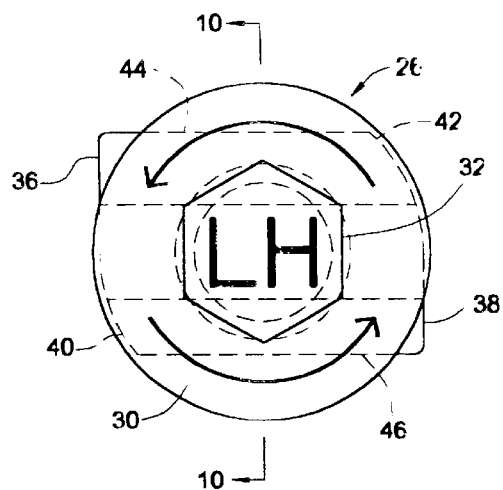
Figure 7:
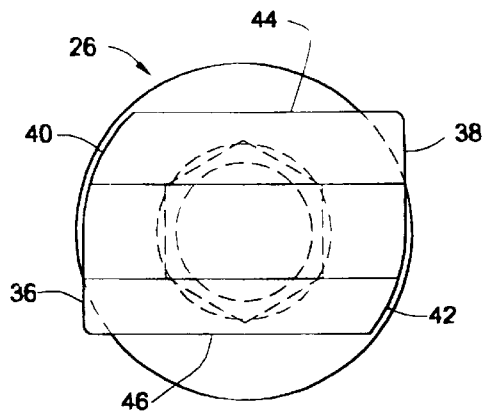
Figure 8:
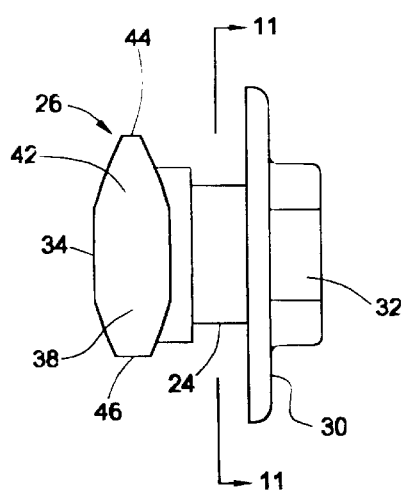
Figure 9:
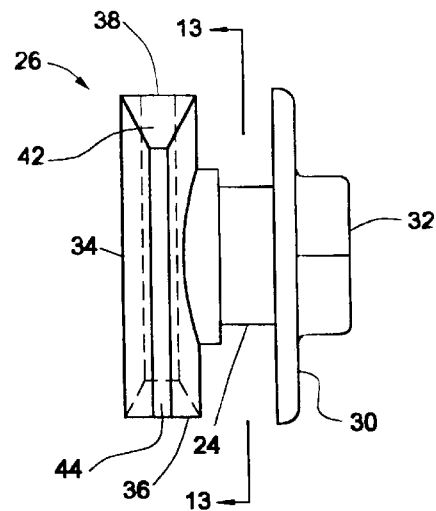

FIG. 6 shows a molded-in legend for "LH" and arrows. As an optional but useful feature, the lock members 26 may be made in left and right versions. The legends inform the installer of which is which and the arrows prompt the installer to rotate the lock member in a specified direction. The left and right versions eliminate "walking" of the lock member when it is rotated and instead promote movement of the end cap into firm abutting relation to the end of the cover during installation due to the axial component of the force applied by the wrench when the lock member is being rotated from the unlocked to the locked position.

FIGS. 14 to 16 show an "end member" in the form of a corner bracket 50 that permits an end cap 16 to serve as an outside corner for two sections of handrail installed on building walls that meet at an outside corner. The corner bracket 50 has bosses 50B-1 and 50B-2 that are the same as the bosses 16B-1 and 16B-2 of the end cap 16 and, therefore, fit into the cavities of the retainer 12 to firmly fix the position of the corner bracket in all directions other than axially. A mounting flange 52 that is the same as the flange 20 of the end cap 16 receives a lock member 26. Thus, the corner bracket 50 is installed on a handrail retainer in the same manner as the end cap 16, as described above. The free end 50FE of the corner bracket 50 is shaped to be received with a close fit within the free end 16-2 of the end cap 16. Ordinarily, the corner bracket 50 will be fitted to the end cap 16 and bonded to it by an adhesive by the manufacturer of the handrail and end member assembly, thus producing a corner section. Upon installation, a handrail section is assembled without the corner section and installed on one wall. The other handrail section is assembled with the corner section and installed on the other wall, the end retainer being fitted to the previously installed handrail section. The installer then moves the lock member 26 associated with the corner bracket 50 from the released to the locked position.

The embodiment described above can, of course, be modified in various ways. For example, the shapes of the handrail and the end piece can vary considerably. Also, the handrail may include a bumper portion below the handgrip that stands away from the wall farther than the handgrip. The cover for the bumper portion may be separate from the cover for the handgrip. The end piece may have more than one part, only one of which is attached to the handrail by a locking member while the other is interlocked with the part that is attached by the lock member.

What is claimed is:

1. A handrail and end member assembly comprising
an elongated handrail having an axis,
an undercut groove of a generally "C" shape in cross section extending axially along at least an end part of the handrail,
an end member received adjacent the end part of the handrail and having a mounting flange portion located in overlapping relation to the undercut groove, and
a lock member coupled to the mounting flange portion so as to prevent movement of the lock member relative to the mounting flange portion in a direction parallel to the handrail axis and to permit rotation relative to the mounting flange portion about a lock member axis perpendicular to the handrail axis and having a locking cam portion received in the mounting groove, the locking cam portion having a configuration to permit the lock member to be moved axially along the locking groove in an unlocked rotational position relative to the locking groove and to frictionally engage walls of the locking groove in a locked rotational position relative to the locking groove and thereby retain the end member against axial movement relative to the handrail.

2. The handrail and end member assembly according to claim 1, wherein the lock member is coupled to the mounting flange portion by reception of a shank on the lock member in a substantially vertically oriented slot in the mounting flange portion of the end member.

3. The handrail and end member assembly according to claim 1, wherein the handrail has a socket portion in at least the end part thereof, and the end member has a positioning boss portion telescopically received in the socket portion of the handrail.

4. The handrail and end member assembly according to claim 1, wherein the lock member has a head having a tool-receiving formation adapted to receive a tool for use to facilitate rotating the lock member.

5. The handrail and end member assembly according to claim 1, wherein the locking cam portion includes upper and lower locking portions lying substantially parallel to the handrail axis in the locked position that frictionally engage opposed upper and lower portions of the undercut groove in the locked position and upper and lower curved lead-in portions adjacent the locking portions that enable the locking portions to be moved gradually into pressure engagement with the upper and lower portions of the undercut groove upon rotation of the lock member from the unlocked position to the locked position.

6. The handrail and end member assembly according to claim 5, wherein the locking cam portion has right and left end portions intermediate the upper and lower locking and lead-in portions.

7. The handrail and end member assembly according to claim 6, wherein the end portions are substantially narrower than the upper and lower portions.

8. The handrail and end member assembly according to claim 7, wherein each of the lead-in portions widens progressively in a direction from the adjacent end portion toward the adjacent locking portion.

9. The handrail and end member assembly according to claim 1, wherein the lock member is unitary and a moldment of a solid polymeric material.

10. The handrail and end member assembly according to claim 1, wherein the handrail has a retainer of extruded aluminum and a cover of a polymeric material received on a portion of the retainer facing away from a wall, and wherein the undercut groove is located on a portion of the retainer that faces toward the wall and is not covered by the cover.

11. The handrail and end member assembly according to claim 10, wherein the lock member is coupled to the mounting flange portion by reception of a shank on the lock member in a substantially vertically oriented slot in the mounting flange portion of the end member, and the end member has a positioning boss portion telescopically received in a socket portion of the handrail so as to retain the end member against movements in any direction radially relative to the handrail axis.

12. The handrail and end member assembly according to claim 11, wherein the lock member has a head portion having a tool-receiving formation adapted to receive a tool for use to facilitate rotating the lock member.

13. The handrail and end member assembly according to claim 10, wherein the locking cam portion includes upper and lower locking portions lying substantially parallel to the handrail axis in the locked position that frictionally engage opposed upper and lower portions of the undercut groove in the locked position and upper and lower curved lead-in portions adjacent the locking portions that enable the locking portions to move gradually into pressure engagement with the upper and lower portions of the undercut groove upon rotation of the lock member from the unlocked position to the locked position.

14. The handrail and end member assembly according to claim 13, wherein the locking cam portion has right and left end portions intermediate the upper and lower locking and lead-in portions.

15. The handrail and end member assembly according to claim 14, wherein the end portions are substantially narrower than the upper and lower portions.

16. The handrail and end member assembly according to claim 15, wherein each of the lead-in portions widens progressively in a direction from the adjacent end portion toward the adjacent locking portion.

17. The handrail and end member assembly according to claim 16, wherein the lock member is unitary and a moldment of a solid polymeric material.

\* \* \* \* \*